United States Patent [19]

Everett, Jr. et al.

[11] Patent Number: 4,857,912

[45] Date of Patent: Aug. 15, 1989

[54] INTELLIGENT SECURITY ASSESSMENT SYSTEM

[75] Inventors: Hobart R. Everett, Jr.; Gary A. Gilbreath, both of San Diego, Calif.

[73] Assignee: The United States of America as represented by the Secretary of the Navy, Washington, D.C.

[21] Appl. No.: 227,923

[22] Filed: Jul. 27, 1988

[51] Int. Cl.[4] .................... G08B 13/16; H04B 9/00; B25J 19/00

[52] U.S. Cl. .................... 340/825.3; 340/522; 340/508; 340/541; 340/825.31; 340/825.32; 340/825.34; 901/46; 901/49; 901/50

[58] Field of Search .................... 901/46, 47, 49, 50; 340/825.3, 825.31, 825.34, 825.32, 825.36, 506, 508, 517, 539, 541, 565, 587, 521, 522; 367/93, 94

[56] References Cited

U.S. PATENT DOCUMENTS

| | | | |
|---|---|---|---|
| 3,988,570 | 10/1976 | Murphy et al. | 340/825.31 |
| 4,081,669 | 3/1978 | Klingman, III | 901/47 |
| 4,401,976 | 8/1983 | Stadelmayr | 340/508 |
| 4,622,538 | 11/1986 | Whynacht et al. | 340/508 |
| 4,652,202 | 3/1987 | Ross et al. | 901/47 |
| 4,772,875 | 9/1988 | Maddox et al. | 340/565 |

FOREIGN PATENT DOCUMENTS

| | | | |
|---|---|---|---|
| 0205930 | 12/1986 | European Pat. Off. | 340/541 |
| 2573893 | 5/1986 | France | 340/541 |

OTHER PUBLICATIONS

"Facility Instrusion Detection System", Ben Barker, 5/14/80, Abstract.

*Primary Examiner*—Donald J. Yusko
*Assistant Examiner*—E. O. Pudpud
*Attorney, Agent, or Firm*—Harvey Fendelman; Thomas G. Keough

[57] ABSTRACT

An intelligent security assessment system includes a multiplicity of sensors for detecting intrusion into an area. Each of the sensors operates on a different principle to detect intrusion. For example, sound, vibration, infrared, microwave and light level sensors are used. A computing system receives the outputs of each of the sensors and is programmed to provide an output based upon an algorithm that minimizes the likelihood of a false indication of intrusion by the intrusion sensors. Each sensor has an on and an off state and the computing system assigns a weighting factor for each sensor that is in the on state. The computing system sums the weighting factors and compares this sum to a reference and then provides a further output when the sum exceeds the reference. This computing system output is utilized to activate an additional intrusion detector such as an ultrasonic detection system and also to activate a video surveillance camera for observance of the area where the intrusion is indicated.

14 Claims, 9 Drawing Sheets

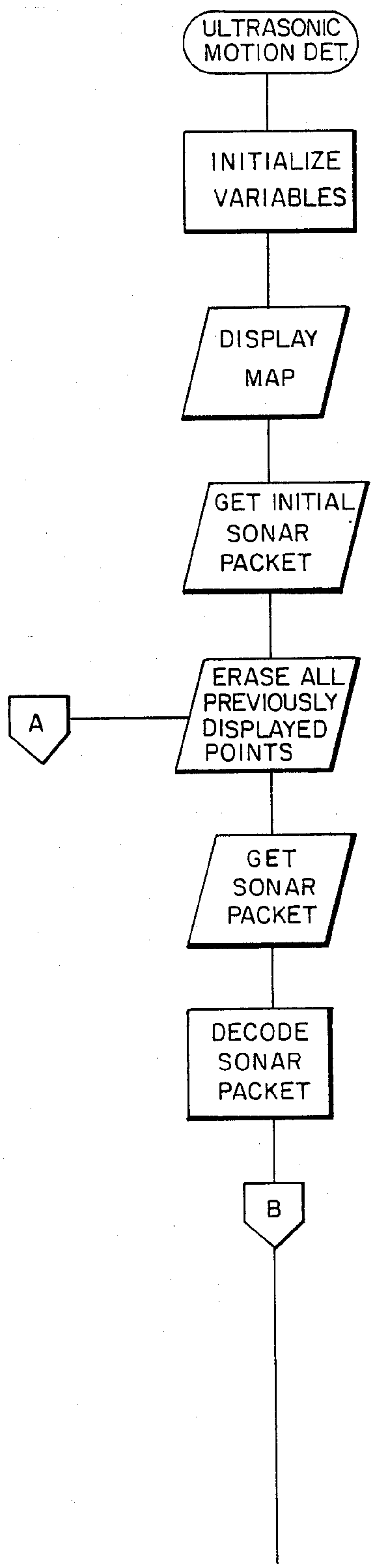
FIG. 5B
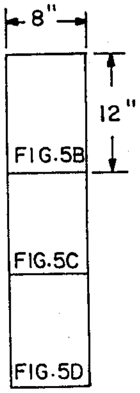

INTELLIGENT SECURITY ASSESSMENT SYSTEM

STATEMENT OF GOVERNMENT INTEREST

The invention described herein may be manufactured and used by or the Government of the United States of America for governmental purposes without the payment of any royalties thereon or therefor.

DOCUMENTS INCORPORATED BY REFERENCE

The following documents are hereby incorporated by reference into this specification: NOSC Technical Document 1230, "Environmental Modeling for a Mobile Sentry Robot", by H. R. Everett, G. A. Gilbreath, and G. L. Bianchini, January 1988; "Security And Sentry Robots" reprinted in *International Encyclopedia Of Robotics Applications And Automation,* copyright 1988 by John Wiley and Sons, Inc., by CDR H. R. Everett; and "Intelligent Security Assessment For A Mobile Sentry Robot", *Proceedings of Institute of Nuclear Materials Management 29th Annual Meeting,* June, 1988, by LCDR H. R. Everett, G. A. Gilbreath, S. L. Alderson, C. E. Priebe, and D. J. Marchette.

BACKGROUND OF THE INVENTION

The present invention relates generally to the field of robotics and to the field of intrusion detectors. More specifically, the present invention relates to the field of robotic intrusion detection systems.

One of the most promising applications for a mobile robotic system is that of a sentry or security guard, patrolling a designated area while monitoring for intrusion and other unwanted conditions such as fire, smoke and flooding. Technological barriers still exist, however, in the implementation of robotics that, in general, hinder near-term implementation of truly autonomous robotic systems. Most tasks performed by humans are extremely complex, requiring extensive hand-eye coordination skills as yet unreplicated by machines. To emulate even the most simplistic action involves acquiring large quantities of data describing the immediate environment, evaluating the data, and then effectuating some response. Current technology does not meet the needs for a reasonably adept and functional mobile system capable of performing human like tasks.

There are many benefits afforded by the utilization of robotic technology in a physical security and surveillance role. The advantage of a system that will not tire, become distracted, frightened, or even subversive are obvious and well-touted. Potential security functions assigned to such a system can be categorized into three general areas: (1) detection, (2) verification, and (3) assessment. Detection is readily addressable by a multitude of commercially available sensors. Verification involves cross checking with other sensors to lessen the chances of a false alarm and depends heavily upon both the type of detectors employed and the operating environment. While simultaneous utilization of a multitude of intrusion sensors has been proposed as in the "Denning Sentry" robot manufactured by Denning Mobile Robots of Woburn, Mass., no robotic intrusion alarm system to date includes the capability of verification through the utilization of cross checking with other sensors to lessen the chances of a false alarm. The assessment task acts upon the data collected to ascertain the nature of the disturbance, usually in order to determine if a response is necessary.

The type of intrusion sensors utilized in a security system are a function of a given application and include those specifically configured to detect intruders as well as those intended for detecting other unwanted conditions as described above. Intrusion is most easily recognized through the use of some type of motion detection scheme or sensor. Described below are several known intrusion sensors.

A very simple form of passive detection capability intended primarily for indoor scenarios is achieved by the utilization of a microphone which "listens" for sounds in the protected area. Vibration monitoring sensors may also be utilized and are usually coupled to the floor through wheel contact when deployed on a mobile platform.

An example of an optical motion detector which responds to changes in perceived light level is manufactured by Sprague, model number ULN-2232A. This integrated circuit incorporates a built-in lens to create a cone-shaped detection field. After a brief settling period upon power-up, the circuit adjusts itself to ambient conditions and any subsequent deviations from that set point result in an alarm output. The low cost and directional nature of the device allows for several to be used collectively in an array to establish unique detection zones which help locate the relative position of the suspected security violation. The ability to provide geometric resolution of the intruder's position can be invaluable in tailoring an appropriate response in minimal time.

Passive infrared motion detectors have recently been employed for intrusion detection. Originally designed for both indoor and outdoor fixed installation security systems, this type of pyroelectric sensor has been utilized on mobile robots due to its small size, low power consumption and excellent performance and reliability characteristics. The principle of operation of such a detector is essentially the same as that of the optical ULN-2232A sensor described above except that a different wavelength (10 micrometer) in the energy spectrum is sensed.

Microwave motion detectors may also be utilized for intrusion detection and operate at radio frequency. Such detectors rely on the Doppler shift introduced by a moving target to sense the relative motion of an intruder. The electromagnetic energy associated with such detectors can penetrate hollow walls and doorways thereby allowing the sensor to "see" into adjoining rooms in certain circumstances. This can be used to advantage by a robot patrolling a hallway to check locked office spaces and storerooms without the need for actual entry into such spaces and rooms.

Video systems may also be utilized as intrusion detectors and offer an even more sophisticated method of sensing intrusion in outdoor as well as indoor applications with the added benefits of excellent resolution in the precise angular location of the intruder. A surveillance camera can be used to digitize a scene for comparison with a previously stored image pattern representing the same region and significant deviations between the two can be attributed to motion within the field of view. "Windowing" techniques can be employed on most systems to selectively designate certain portions of the image to be ignored, such as a tree blowing in the wind, resulting in a significant reduction in nuisance alarm.

The traditional problem encountered in applying the aforementioned and other intrusion sensors in an automated security system has been the unacceptable increase in the nuisance alarm rate that occurs as the detector sensitivity is raised so as to provide the necessary high probability of detection. Operators quickly lose confidence in such systems where sensors are prone to false activation. As an example, passive infrared motion detectors can be falsely triggered by any occurrence which causes a localized and sudden change in ambient temperature within this sensor's coverage area. This can sometimes occur naturally as where a heating or cooling system is turned on or off. Optical motion detectors can be activated by any situation which causes a change in ambient light level. Again, this situation could be caused by some non-critical event, such as passing automobile headlights or lightning flashes. Discriminatory hearing sensors can be triggered by loud noises originating outside the protected area such as thunder, passing traffic or overflying aircraft. Microwave motion detectors can respond to rotating or vibrating equipment.

SUMMARY OF THE INVENTION

The present invention provides a multi-sensor detection, verification and intelligent assessment capability for a mobile security robot or stationary alarm system which allows the system to exhibit a high probability of detection with the ability to distinguish between actual and nuisance alarms. In accordance with the present invention, because the likelihood of false alarms is minimized, the sensitivity of each intrusion sensor can be raised.

In accordance with the intelligent security assessment system of the present invention a variety of intrusion detection sensors are utilized and no single detector is relied upon exclusively. This redundancy serves the purposes of thwarting attempts to defeat the system and also provides a means of verification to reduce the occurrence of nuisance alarms. In accordance with the present invention, numerous different types of broad coverage sensors which are preferably energy efficient are utilized as primary detection devices. Higher resolution sensors which may be less energy efficient are used to verify and more clearly characterize a suspected disturbance in a secondary confirmation mode. The system is alert at all times but its acuity can be enhanced by self-generated actions which activate these additional systems when needed to better discriminate among and between sensor stimuli.

The present invention employs a fixed array of sensitive, low-resolution sensors with overlapping coverage, e.g. 180 degree coverage, to obtain the necessary high probability of detection. These low-resolution sensors may, for example, include vibration, auditory, infrared, optical and microwave motion detection schemes as described above. The area of coverage may be divided into discrete zones, with different types of redundant motion detection schemes assigned to each zone. Additional high-resolution sensors which may, for example, be ultrasonic and video sensors may be deployed on a panning mechanism either on a mobile robot or in a stationary alarm system which enables specific directionality at areas of suspected disturbance for purposes of verification. Assessment of the results is performed in accordance with the present invention by appropriate software or firmware which cross-correlates between redundant primary sensors within a specific detection zone and schedules and interprets subsequent verification by the secondary high-resolution positionable sensors.

The invention thus extends the concept of a mobile robotic or stationary security system to include the tasks of verification and assessment as opposed to merely detection. In accordance with the present invention the capability may also be included for dealing with aberrations in the sensors themselves giving rise to erroneous readings and/or spurious readings due to naturally occurring external events and for dealing with failure of a discrete sensor or even subsystem.

The present invention includes real time assessment 7 software or firmware which performs a summation of weighted scores for all sensors within a particular zone and calculates a composite threat score which is proportional to the perceived threat presence. Individual sensor weights are initially established through statistical analysis of data characterizing individual sensor performance under known conditions as logged over a long period of time. The software (or firmware) detects patterns, such as purposeful motion across adjacent zones and increases the associated composite threat accordingly. The assessment capability which may be implemented in a central processing unit then activates and positions secondary verification sensors as needed. At the same time, the current alarm threshold may be dynamically calculated, based on the number of sensor groups which are available and other relevant conditions such as ambient lighting, time of day, etc. Capability can be included within the scope of the present invention to classify an alarm as an actual intrusion only when a complete evaluation has been performed using all sensor groups and the resulting composite threat score exceeds the alarm threshold.

As an option to the present invention, off-line assessment software may also be utilized to analyze large amounts of logged data as produced by the real time processor. Historical trends and patterns may be analyzed to determine information which does not show up when assessing only the instantaneous data. The off-line assessment portion of the present invention can thereby output parameters which can vary the operation of the real time assessment loop. For example, the weighting factors for certain types of sensors under certain conditions can be adjusted, a defective sensor can be flagged, the alarm threshold can be adjusted or the sentry robot can be deployed to a new location. In accordance with this embodiment of the present invention the system can "learn" from past experiences while maintaining a rapid real time response capability.

More particularly, in the preferred embodiment of the present invention, the outputs of each of a plurality of different types of intrusion detector sensors is coupled to a local central processing unit. This local central processing unit determines whether or not each of the outputs from the various intrusion detectors is in an "on" or an "off" condition and assigns a weighting factor to each output that is in the "on" condition. It then calculates the sum of the weighting factors and transmits this sum along with information as to the condition of each of the sensors, i.e. whether they are "on" or "off", to a host central processing unit at a remote location. The host central processing unit compares this sum to a reference threshold and makes a determination as to whether or not high-resolution positionable sensors should be activated. If the threshold is exceeded a high-resolution verification sensor such as an ultrasonic motion detector system sensor is activated. Also activated simultaneously therewith is a video surveillance camera mounted on the head of the sentry robot or mounted at a suitable location in the stationary alarm system (where a moveable robot is not utilized). If the high-resolution intrusion detector system indicates motion within its field of view, then the video surveillance camera is directed towards the location indicated by the high-resolution motion detector. The video image detected by the video surveillance camera can then be viewed via a remote monitor.

OBJECTS OF THE INVENTION

Accordingly, it is the primary object of the present invention to disclose a security assessment system that allows for high detector sensitivities yielding a high probability of detection.

It is a further object of the present invention to disclose a security assessment system that provides for cross-correlation among sensor groups to minimize nuisance alarm rates.

It is a further object of the present invention to disclose a security assessment system that can automatically train a video camera at the location of a suspected intrusion for operator assessment in response to an indication of intrusion generated by sensors other than the camera.

Another object of the present invention is to disclose an intrusion detector system capable of adaptive learning as ambient conditions or sensor location/orientation change.

A still further object of the present invention is to disclose a security system that utilizes cross-correlation of a multiplicity of intrusion detection sensors, each operating on a different principle, and which computes a composite threat assessment to thereby differentiate between nuisance and actual alarms.

These and other objects of the invention will become more readily apparent from the ensuing specification when taken together with the drawings.

BRIEF DESCRIPTION OF THE DRAWINGS

FIGS. 5A, 5B, 5C and 5D collectively comprise a flowchart of the function of the host central processing unit of the present invention illustrated in FIG. 1.

DESCRIPTION OF THE PREFERRED EMBODIMENT

Figure 1:
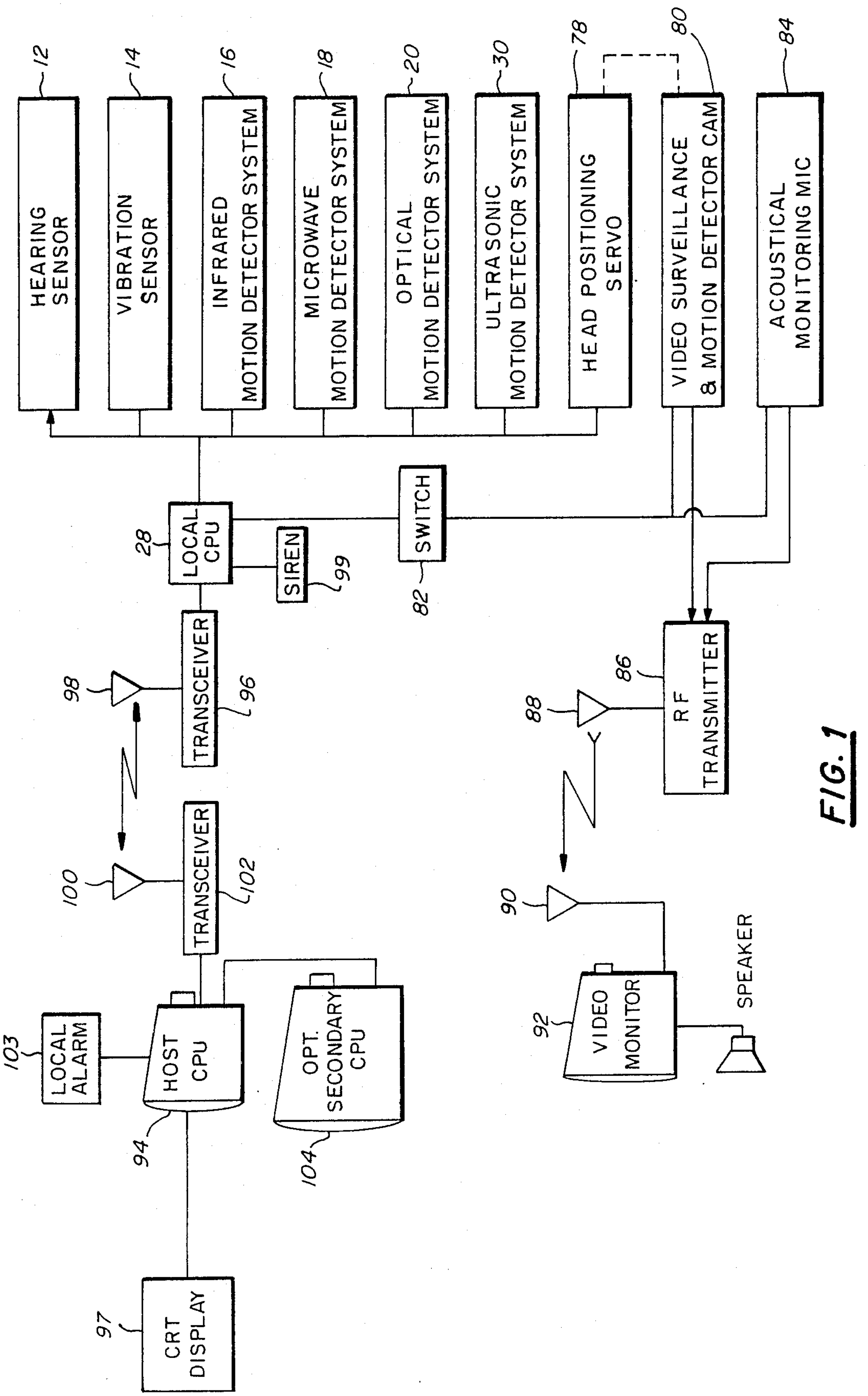
FIG. 1 is a schematic diagram of the intelligent security system of the present invention.

Referring now to FIG. 1, the components of the intelligent security assessment system of the present invention will now be described. A plurality of intrusion detector sensors are preferably mounted on a mobile sentry robot (not shown). The sentry robot may be of the type disclosed and described in the above referred to documents incorporated by reference herein. By way of example, the intrusion detector sensors may comprise hearing sensor 12, vibration sensor 14, infrared motion detector system 16, microwave motion detector system 18, and optical motion detector system 20.

The intrusion detector sensors 12, 14, 16, 18 and 20 have been functionally described in the Background of the Invention above. To reiterate briefly, hearing sensor 12 comprises an omni-directional sensor that detects changes in ambient sound level as is well known. Vibration sensor 14 may comprise an omni-directional sensor that detects environmental vibrations as is well known. Infrared motion detection system 16 may, for example, comprise a set of four passive infrared sensors, spaced 45 degrees apart with a coverage of 180 degrees in front of the sentry robot. Each passive infrared sensor detects changes in ambient infrared radiation as is well known. Microwave motion detection system 18 may comprise a single omni-directional sensor which detects motion using microwave Doppler shift as is well known. Optical motion detection system 20 may, for example, comprise a set of four passive visible light sensors, colocated with the infrared sensors 16. Each of the four passive visible light sensors detects changes in visible light level.

Figure 2:
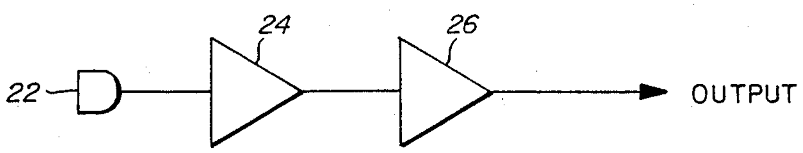
FIG. 2 is a schematic diagram illustrating, by way of example, intrusion detector systems which may be utilized in the present invention.

Referring to FIG. 2, by way of example, hearing sensor 12 may be implemented as illustrated in FIG. 2 by connecting microphone 22 to amplifier 24. The amplifier 24 output is connected to the input of threshold detector 26 which provides an output when the input from amplifier 24 exceeds a reference threshold as is well known. The output of threshold detector 26 is, therefore, either a binary "high" or a binary "low", i.e. "on" or "off".

Vibration sensor 14 may be implemented similarly to hearing sensor 12 by utilizing a piezoelectric transducer in lieu of microphone 22.

In the preferred embodiment of the present invention the output of each of the intrusion detector sensors 12, 14, 16, 18 and 20 is either, "on" or "off". The "on" condition indicates that the particular sensor has detected an intrusion and the "off" condition indicates that no intrusion has been detected by that particular sensor.

The output of each of the intrusion detector sensors 12, 14, 16, 18 and 20 is connected to local central processing unit 28 which may, for example, comprise a Rockwell 6502-based CMOS microcomputer.

It is to be understood that although the intrusion detector sensors 12, 14, 16, 18 and 20 illustrated in FIG. 1 are relatively low power, low-resolution sensors, high-resolution, high power sensors may also be utilized in place of or in addition to these sensors.

Figure 3:
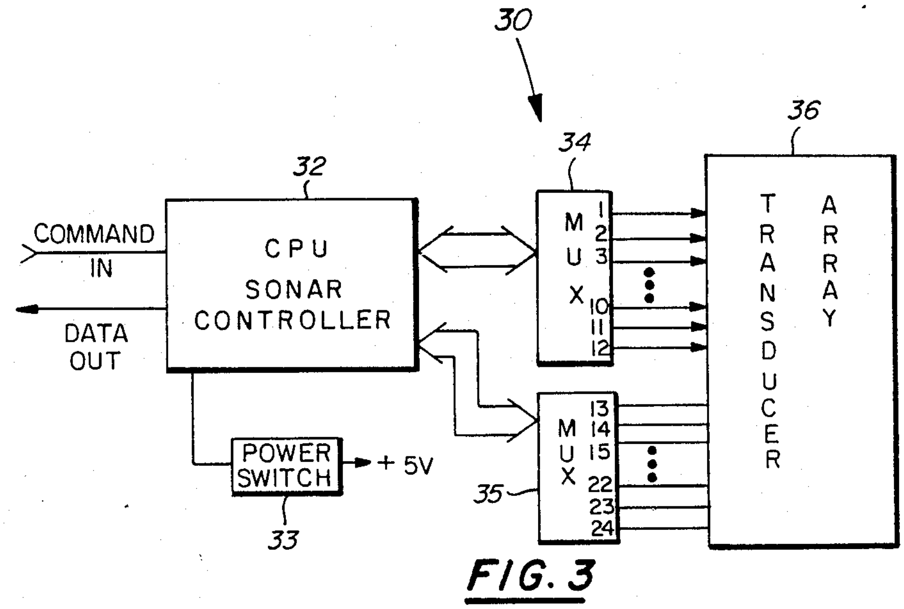
FIG. 3 is a schematic block diagram of a high-resolution intrusion detector sensor suitable for use in the present invention.

An additional intrusion detector sensor 30 also has its output connected to the input of local central processing unit 28. In the preferred embodiment of the present invention the intrusion detector sensor 30 comprises an ultrasonic motion detector system which may, for example, comprise a set of 12 or 24 active ultrasonic ranging sensors, spaced 30 or 15 degrees apart forming a sensor ring around the sentry robot. Ultrasonic motion detector system 30 may, by way of example, be comprised of the Transitions Research Corporation "Labmate" Ultrasonic Ranging System. Alternatively, in the preferred embodiment of the present invention, the ultrasonic ranging system employs a multitude of prepositioned transducers that are individually selected at will, thus enabling the robot to get range information in any given direction at any particular time. Since in reality there is associated with each sensor some overhead in terms of physical space requirements, power consumption , interface circuitry, and acquisition cost, an array size of 24 transducers 36 was chosen for implementation on the prototype robot. Ultrasonic motion detector system 30 may be embodied as illustrated in FIG. 3. Referring to FIG. 3 the ultrasonic motion detector system 30 may be comprised of central processing unit 32 which receives commands from local central processing unit 28 and which is operably coupled to multiplexers 34 and 35. The outputs of multiplexers 34 and 35 are connected to the ultrasonic transducer array 36 which contains a first array of twelve transducers coupled to multiplexer 34 and a second array of twelve transducers coupled to multiplexer 35.

Multiplexers 34 and 35 are substantially identical. Therefore it is to be understood that the description of multiplexer 34 illustrated and described with respect to FIGS. 4 and 5 also apply to multiplexer 35.

Figure 4:
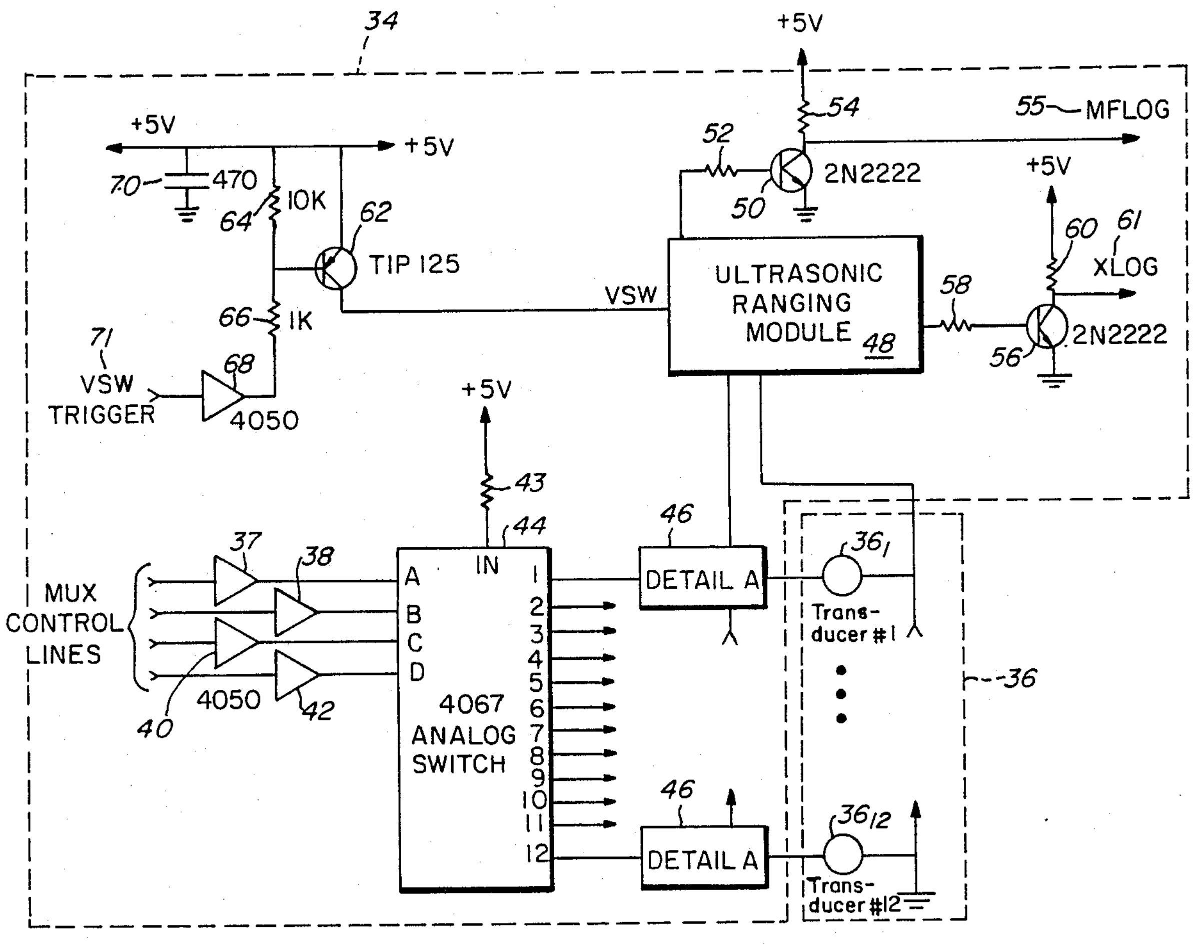
FIG. 4 is a schematic electrical diagram of the multiplexer portion of FIG. 3 of the present invention.

The details of multiplexers 34 and 35 illustrated generally in FIG. 3 are shown in FIGS. 4 and 5. The 24 ultrasonic transducers 36 are interfaced to two ultrasonic ranging modules 48 through dual 12-channel multiplexers 34 and 35, in such a way that only two transducers, 180 degrees apart in the array, are fired simultaneously. The ultrasonic ranging modules 48 may be "Polaroid" ranging modules, model #SN28827, as are well known. The heart of each multiplexer is a 4067 analog switch as shown in FIG. 4. The central processing unit 32 thus "sees" only two transducers at a time through the respective multiplexers 34 and 35, and the central processing software merely executes in a loop, each time incrementing the index which enables a specific pair of transducers 36.

Ultrasonic ranging module 48, if implemented with Polaroid model #SN28827, is an active time-of-flight device developed for automatic camera focusing, and determines the range to target by measuring elapsed time between the transmission of a "chirp" of pulses and the detected echo. The "chirp" is of one millisecond duration and consists of four discrete frequencies transmitted back-to-back: 8 cycles at 60 kHz, 8 cycles at 56 kHz, 16 cycles at 52.5 kHz, and 24 cycles at 49.41 kHz.

To simplify the circuitry involved, all timing and time-to-distance conversions are done in software on central processing unit 28. Three control lines are involved in the interface of the ultrasonic circuit board 48 to a microprocessor. The first of these, referred to as VSW, initiates operation when brought high to +5 volts. A second line labelled XLOG signals the start of pulse transmission, while the line labelled MFLOG indicates detection of the first echo. The controlling microprocessor must therefore send VSW high, monitor the state of XLOG and commence timing when transmission begins (approximately 5 milliseconds later), and then poll MFLOG until an echo is detected or sufficient time elapses to indicate there is no echo.

Figure 4A:
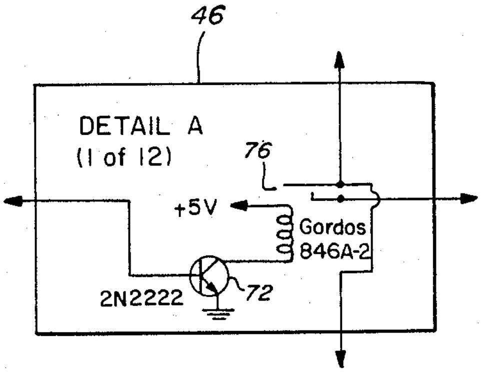
FIG. 4A is a schematic electrical diagram of the transducer switching relay (Detail A) of FIG. 4.

Four input/output (I/O) lines from the central processing unit 32 handle the transducer switching function, activating simultaneously the two 4067 analog switches 44. The binary number placed on these I/O lines by the microprocessor determines which channel is selected by the switch 44; all other channels assume a high impedance state. Referring to FIG. 4A, each of the relays 76 and its associated driver transistor 72 illustrated in FIG. 4 as Detail A is substantially identical and illustrated in detail in FIG. 4A. The relay driver transistors are biased into conduction by current limiting resistor 43 via the active channel of analog switch 44 in such a fashion such that only one transistor 72 per switch 44 is conducting at any given time, as determined by the binary number present at the outputs of buffers 37, 38, 40, and 42. This conducting transistor 72 sinks current through its associated relay coil, closing the contacts of relay 76. This action causes one of the transducers in array 36 to be connected to and hence driven by the ultrasonic ranging unit 48, when it in turn is activated by central processing unit 32 as described below.

Three I/O lines carry the logic inputs to central processing unit 32 from the ranging module 48 for XLOG and MFLOG, and from central processing unit 32 to the ranging module 48 for VSW. Non-inverting buffer 68 is used to trigger switching transistor 62 upon command from central processing unit 32 to initiate the firing sequence of ranging module 48. Resistors 58 and 60 along with transistor 61 form an inverting buffer for the signal which indicates the actual start of pulse transmission. Resistors 52 and 54 along with transistor 50 form an inverting buffer for the MFLOG signal which indicates detection of the echo. A final I/O line from central processing unit 32 activates switch 33 to power down the interface circuitry and the ranging units when not in use to save battery power.

A second parallel port on the central processing unit 32 is used to receive commands from the local central processing unit 28 which tell central processing unit 32 to power up the ranging units, and then, which sensors to sequentially activate. Commands may be in the form of an eight-bit binary number represented in hexadecimal format, where the upper nibble represents the starting ID and the lower nibble the ending ID for the sequence. For example, the command $1C can be used to activate and take ranges using sensors #1 through #12 sequentially. Each time through the loop, upon completion of the sequence, the stored ranges are transmitted up the hierarchy to the local central processing unit 28 over an RS-232 serial link, with appropriate handshaking. The sequence is repeated in similar fashion until such time as the local central processing unit 28 sends a new command down, or advises central processing unit 32 to power down the ranging system with the special command $FF.

Figure 7A:
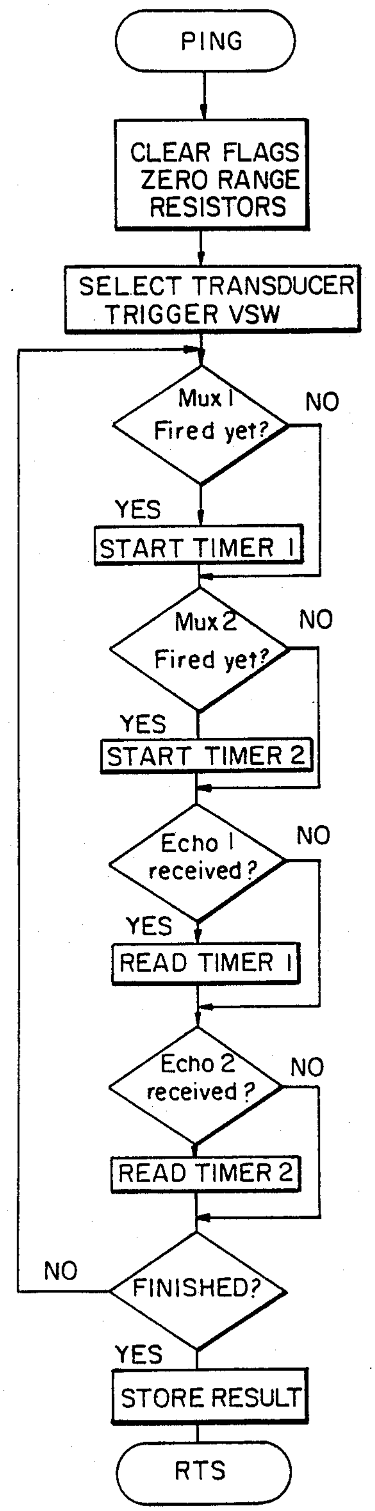
FIGS. 7A and 7B are flowcharts of the function of the central processing unit associated with the ultrasonic motion detector system of the present invention.
Figure 7B:
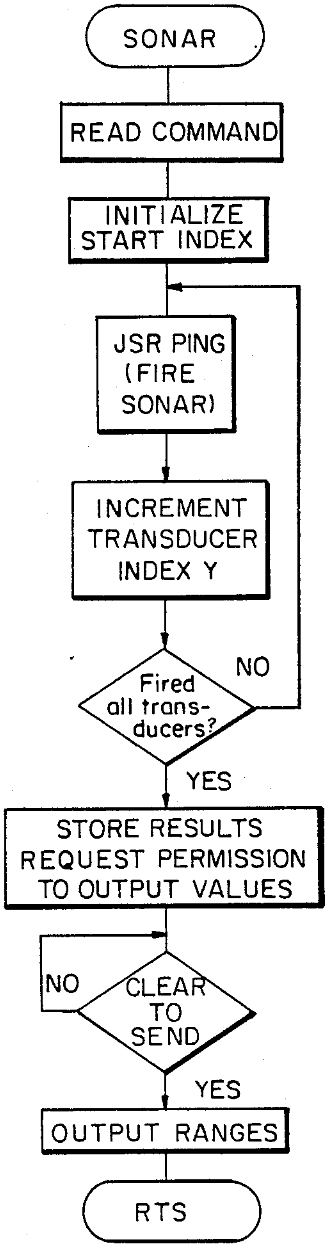

The central processing unit 32 software may, by way of example, be structured as shown in FIGS. 7A and 7B. When energized by the local central processing unit 28, central processing unit 32 does a power-on reset, initializes all ports and registers, and then waits for a command. When a command is latched into the I/O port, a flag is set automatically that alerts the microprocessor, which then reads the command and determines the starting and ending identities of the transducers 46 to be sequentially activated. The interface circuitry and ranging units are then powered up, and the Y Register is set to the value of the first transducer to be fired.

Continuing the example, Subroutine PING is then called, which enables the particular channel of analog switch 44 dictated by the contents of the Y Register. The VSW control line is sent high, which initiates operation of the ranging module 48 with the selected transducer. The software then watches the multiplexer output XLOG for indication of pulse transmission, before initiating the timing sequence. The contents of the timing counter, representing elapsed time, can be used to calculate range to the target. If this value ever exceeds the maximum specified range of the system, the software will exit the loop, otherwise the counter runs until MFLOG is observed to go high, indicating echo detection. Upon exit from the timing loop, the range value for that particular transducer is saved in indexed storage, and Subroutine PING returns to the main program.

The Y Register is then incremented to enable the next ranging module in the sequence, and Subroutine PING is called again as before. This process is repeated until the Y Register equals the value of the ending index, signifying that all transducers in the sequence specified by the local central processing unit 28 have been activated individually. Central processing unit 32 then requests permission from the local central processing unit 28 to transmit all the stored range values via the RS-232 serial link. When acknowledged, the ranges are sequentially dumped out the serial interface and placed by the local central processing unit 28 in Page Zero indexed storage. Upon completion, central processing unit 32 checks to see if a new command has been sent down altering the ranging sequence, and then repeats the process using the appropriate starting and ending indexes. Thus the software runs continuously in a repetitive fashion, sequentially activating the specified ranging modules, converting elapsed time to distance, storing the individual results, and then finally transmitting all range data at once to the local central processing unit 28, which is thus freed from all associated overhead.

Servomechanism 78 referred to as Head Positioning Servo in FIG. 1 is mounted on the sentry robot (not shown) and is used for positioning the video surveillance and motion detector camera 80 that is preferably mounted on the head of the sentry robot. The head positioning servo mechanism 78 receives commands from the local central processing unit 28. Video surveillance and motion detector camera 80 is normally maintained in the "off" condition and is activated to the "on" condition via switch 82 which receives instruction from local central processing unit 28. Likewise, ultrasonic motion detector system 30 is normally in the "off" condition until powered up via instruction from the local central processing unit 28.

Similarly, acoustical monitoring microphone 84 is located on the sentry robot and is normally "off" but may be turned on via instruction from the local central processing unit 28 through switch 82. The video and audio outputs of the surveillance camera 80 and the microphone 84 are transmitted via transmitter 86 and antenna 88 through antenna 90 to video monitor 92 for remote viewing and listening of the area under surveillance.

Local central processing unit 28 is linked to host central processing unit 94 via the communication link comprising transceiver 96, antenna 98, antenna 100 and transceiver 102. A second optional central processing unit 104 may also be connected to host central processing unit 94 for purposes described in further detail below.

The intelligent security assessment system operates generally as follows. Local central processing unit 28 receives commands from the host central processing unit in data "packet" form over the radio link 102, 100, 98, and 96. The packet is decoded and a command is issued to the appropriate subsystem or subsystems (i.e. sensors, servo). If the command requires that data be returned to the host processor 94, the information is retrieved by the local central processing unit 28 from the subsystem, placed in a data "packet", and transmitted back to the host central processing unit 94 via the same transmission link.

In the security assessment mode, each of the intrusion detection sensors 12, 14, 16, 18 and 20 are powered up. The ultrasonic motion detector system 30 is not powered nor is the video surveillance and motion detector camera 80. By leaving the detector system 30 and camera 80 unpowered, valuable battery power on the sentry robot may be conserved. In the security assessment mode, the local central processing unit 28 gathers information from the intrusion detection sensors 12, 14, 16, 18 and 20 which furnish binary outputs to central processing unit 28. The outputs from each of these sensors is, therefore, either "on" or "off". If the output of any of these detector sensors is "on", the local central processing unit 28 assigns a weighting factor for that particular sensor. Local central processing unit 28 then sums the weighting factors assigned for each detector sensor that was in the "on" condition. Thereby, a preliminary composite "threat" assessment is made. The higher the value of the sum computed, the greater the possibility that an intruder has been detected. This sum value along with data indicating the condition, i.e. either "on" or "off", of each sensor is then transmitted to the host central processing unit 94 via the radio transmission link 96, 98, 100, and 102.

The host central processing unit 94 then decodes this transmitted information and updates the status display on display console 97. Host central processing unit 94 then compares the composite threat assessment information transmitted from local central processing unit 28 with a threshold value. If the threat is greater than the threshold value, the host central processing unit 94 sends a command to the local central processing unit 28 via the transmission link to activate the ultrasonic motion detector system 30 and the video camera and microphone subsystem 80 and 84, respectively. The local central processing unit 28 retrieves the range data acquired from the ultrasonic motion detector system 30 and sends this data along with the infrared motion detector system sensor data to the host processing unit 94 via the transmission link.

Host central processing unit 94 compares the current range data received from ultrasonic motion detector system 30 with the range values previously received from each of the sensors in the motion detector system 30, looking for a change in range, indicating a possible intrusion. If one or more of the ultrasonic sensors indicates movement, the corresponding infrared sensor or sensors are examined. If the corresponding infrared sensor(s) is "on", indicating a change in ambient infrared level, the host central processing unit 94 sends a command to the local central processing unit 28 to instruct the head positioning servo 78 to position the sentry robot head, and thereby the video surveillance and motion detector camera 80 mounted thereon, in the direction of the disturbance.

The video information from the camera is then examined by subtracting successive video frames. If motion is detected, alarm 103 may be activated to alert the guard to the intruder's presence. Siren 99 on the sentry robot may also be activated. Meanwhile, the sentry robot head containing the video surveillance camera is continually positioned such that the area of detected motion is centered in the camera's field of view, thereby allowing a human to quickly ascertain the nature of the intrusion.

Since each of the sensors 12, 14, !6, 18, 20 and 30 may be activated by some different type of stimuli which may or may not indicate an intrusion, by utilizing the previously described technique the nuisance alarm rate is lowered.

Figure 5A:
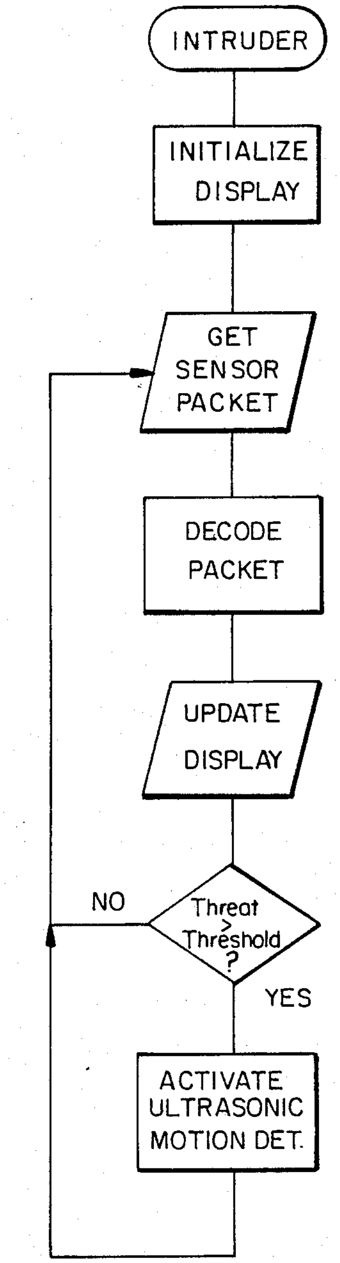

Referring to FIGS. 5A and 5B, a flowchart describing the programming of central processing unit 94 will now be described. Initially, the central processing unit, when placed in the intruder mode, initializes display 96 to bring up on the screen 97 the various information items to be displayed. An example of such a display is illustrated in the article described above entitled "Intelligent Security Assessment For A Mobile Sentry Robot". The central processing unit then requests information in the form of a data "packet" from the central processing unit 28 which it receives in an encoded form and which it then decodes. This data "packet" includes information indicating which of the intrusion detector sensors are in an alarm (i.e. "on") condition. CPU 94 then determines whether the weighted sum received from local central processing unit 28 exceeds a predetermined threshold. If the threshold is exceeded thereby indicating that the primary sensors 12, 14, 16, 18 and 20 "believe" that there has been an intrusion CPU 94 then activates the ultrasonic motion detector 30 via the transmission link and central processing unit 28. If the threshold has not been exceeded, central processing unit 94 continues to examine the sensor "packets" transmitted from local central processing unit 28.

Figure 5C:
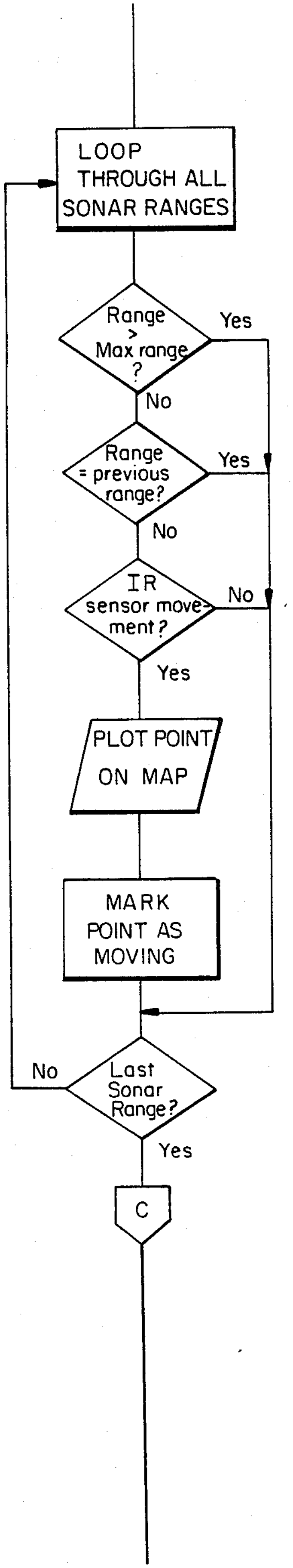
Figure 5D:
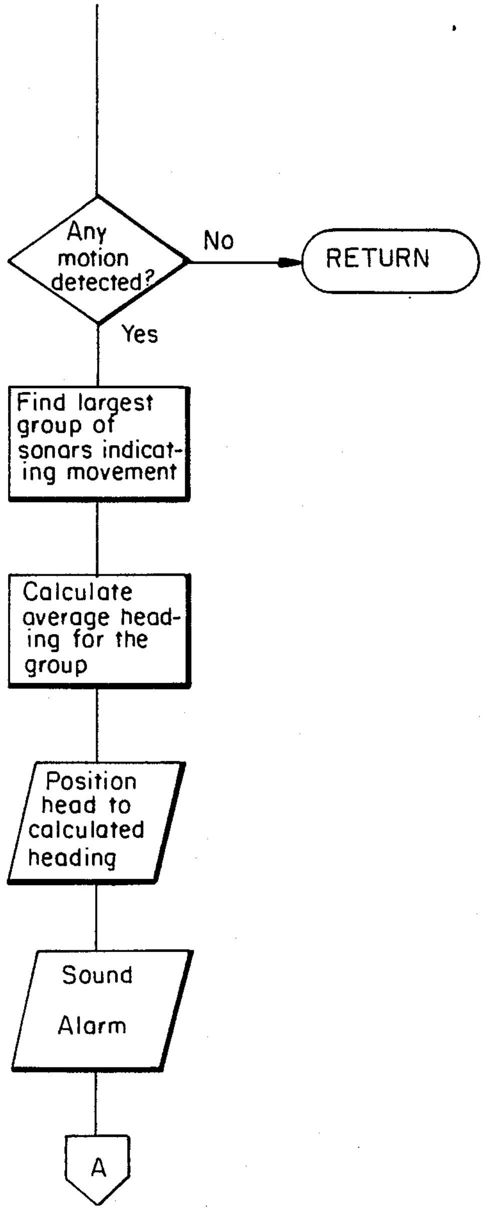

Once the ultrasonic motion detector system 30 has been activated the host central processing unit 94 program operates as illustrated in FIGS. 5B, 5C and 5D as follows. First, the ultrasonic motion detector variables are initialized and a map of the area under surveillance is displayed on the screen. By way of example, a map as described above is illustrated in the aforesaid article entitled "Intelligent Security Assessment For A Mobile Sentry Robot". The initial sonar "packet" is then obtained from the ultrasonic motion detector system central processing unit 32. This "packet" includes data obtained from each of the transducers in the sonar array of detector system 30, representing ranges of each of the objects in the area under surveillance. These ranges are plotted and a determination is made as to whether or not any of the ranges has changed to thereby indicate motion. If this motion is within the same zone as motion detected by the infrared motion detector system 16 then the location of the motion is plotted as a point on the map. No plot will be made if the range indicated is greater than the maximum range of the transducers or if the range equals the previously indicated range thereby indicating no motion in that region. Thus, if there has been a change in the range of an object detected by ultrasonic motion detector system 30 and there has been an indication of motion in that same region by the infrared motion detector system 16, then a point is plotted on the map displayed on display screen 97, the plotted point being the position of motion detected by the two sensors 16 and 30. Once motion has been detected then central processing unit 94 examines the data obtained from the transducer array 36 to determine the largest group of sonar transducers indicating movement and calculates the centroid of the area of motion from this data. Central processing unit 94 then calculates the average heading for this group of transducers and instructs head positioning servo mechanism 78 to position the sentry robot head and thereby the video surveillance camera 80 to that heading. The video camera is thereby positioned to view the intrusion area. An alarm or siren 99 located on the sentry robot may be activated by central processing unit 28 at this time via instruction from central processing unit 94 and, likewise, alarm 103 at the remote location of central processing unit 94 may also be activated via an output from central processing unit 94.

Figure 6:
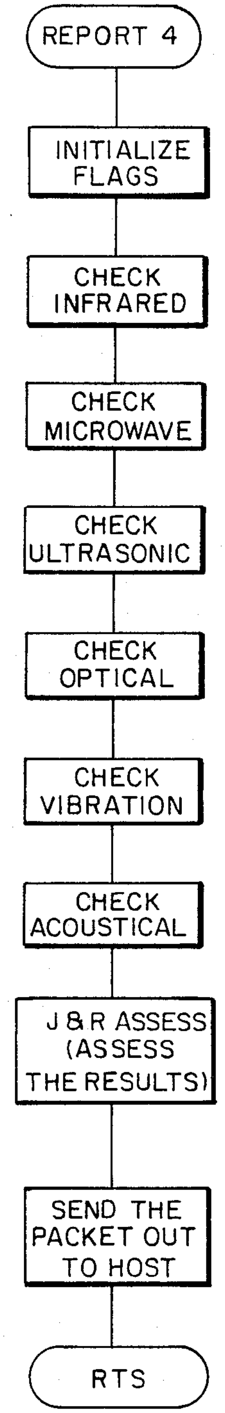
FIG. 6 is a flowchart of the function of the local central processing unit illustrated in FIG. 1 of the present invention.

Referring now to FIG. 6 a flowchart of the programming of local central processing unit 28 will now be described. First, the flags are initialized that are used to encode the information that is transmitted back to host central processing unit 94. Then, sequentially the outputs of each of the low-resolution intrusion detector sensors 12, 14, 16, 18 and 20 are checked to determine whether they are "on" or "off". A "bit" is set in the flag for each of the outputs from the sensors 12, 14, 16, 18 and 20 that is determined to be in the "on" condition. Further, the central processing unit 28 also assigns a weight factor or value for each detector that was determined to be in the "on" condition and sums these weights. The sum is included in the information "packet" sent back to the host central processing unit 94. The weight summation and individual sensor condition may thereby be displayed on CRT 97.

As an optional feature of the present invention secondary central processing unit 104 may be employed to provide an adaptive temporal assessment capability that increases the ability of the sentry robot to make intelligent decisions in changing and unstructured environments. A neural network approach may be utilized to vary the operating parameters of the central processing unit 28. For example, the weighting factors for certain types of sensors under varying conditions may be adjusted, defective sensors may be flagged, the alarm threshold may be adjusted, or the robot may be redeployed to a new location. In this manner, the system can "learn" from past experiences while maintaining a rapid real time response capability.

Obviously, many modifications and variations of the present invention are possible in the light of the above teachings. It is therefore to be understood that within the scope of the appended claims the invention may be practiced otherwise than as specifically described

We claim:

1. A system comprising:

m sensors, m being a positive integer, each for deteeting intrusion into an area and each having an output, each said output having an on state and an off state;

computing means connected to said outputs of each of said m sensors for determining whether or not each of said outputs is in said on state, for assigning a weighting factor to each said output that is in said on state, for calculating the sum of all said weighting factors, for comparing said sum to a reference and for providing an output when said sum exceeds said reference;

n sensors, n being an integer, having an on state and an off state, for detecting intrusion into said area, operably coupled to said computing means for receiving said computing means output and being activated to said on state thereby.

2. The system of claim 1 further comprising:

a video camera operably coupled to said computing means.

3. The system of claim 2 wherein:

said video camera has an on state and an off state and wherein said video camera is activated to said on state by said computing means.

4. The system of claim 1 wherein:

each of said m sensors is a different type of intrusion sensor.

5. The system of claim 4 wherein:

each of said m sensors is a sensor selected from the group comprising a microphone, a vibration sensor, an infrared motion detector, a microwave motion detector and an optical motion detector.

6. The system of claim 5 wherein:

at least one of said n sensors is an ultrasonic motion detector.

7. The system of claims 1, 2, 3, 4, 5 or 6 wherein said computing means comprises:

a first central processing unit for performing said sum calculation;

a second central processing unit for performing said comparison of said sum to said reference and for providing said output when said sum exceeds said reference; and a communication link operably coupled to said first and second central processing units.

8. The system of claim 7 wherein:

said communication link comprises a radio frequency transmission link.

9. The system of claim 1 further comprising:

a display operably coupled to said computing means for displaying a map of said area.

10. The system of claim 9 wherein:

at least one of said m sensors comprises an ultrasonic motion detector.

11. The system of claim 10 wherein:

said computing means is further for determining the range of each of the objects in said area and for determining whether or not any of the ranges has changed to thereby indicated motion within said area.

12. The system of claim 11 wherein:

said computing means is further for plotting a point on said map corresponding to the location in said area wherein said motion is detected.

13. In an intrusion detection system having a plurality of different types of sensors for detecting intrusion into an area, each of said sensors having an output, the improvement comprising:

computing means connected to said outputs of each of said plurality of sensors for minimizing the likelihood of a false indication of intrusion into said area, the outputs of each of said sensors having an on state and an off state; and further wherein said computing means is for determining whether or not each of said outputs is in said on state, assigning a weighting factor to each said ouput that is in said on state, calculating the sum of all said weighting factors, comparing said sum to a reference and providing an output when said sum exceeds said reference.

14. The improvement of claim 13 further comprising:

at least one additional intrusion detector having an on state and an off state, connected to receive said computing means output, said computing means activating said at least one additional intrusion detector to said on state upon the occurrence of said output.

* * * * *